(12) United States Patent  
Gonzalez et al.

(10) Patent No.: US 7,480,810 B2
(45) Date of Patent: Jan. 20, 2009

(54) VOLTAGE DROOP DYNAMIC RECOVERY

(75) Inventors: Christopher J. Gonzalez, Shelburne, VT (US); Paul D. Kartschoke, Williston, VT (US); Vinod Ramadurai, South Burlington, VT (US); Mathew I. Ringler, Burlington, VT (US)

(73) Assignee: International Business Machines Corporation, Armonk, NY (US)

( * ) Notice: Subject to any disclaimer, the term of this patent is extended or adjusted under 35 U.S.C. 154(b) by 279 days.

(21) Appl. No.: 11/276,101

(22) Filed: Feb. 14, 2006

(65) Prior Publication Data

US 2007/0192636 A1    Aug. 16, 2007

(51) Int. Cl.
*G06F 1/00* (2006.01)
*G06F 11/30* (2006.01)

(52) U.S. Cl. .................. 713/300; 713/340; 712/205
(58) Field of Classification Search .......... 713/300, 713/340; 712/205
See application file for complete search history.

(56) References Cited

U.S. PATENT DOCUMENTS

| | | | |
|---|---|---|---|
| 5,537,656 A * | 7/1996 | Mozdzen et al. ........ 713/323 |
| 6,675,301 B1 * | 1/2004 | Kurosawa ............... 713/300 |
| 6,738,894 B1 * | 5/2004 | Iwata .................. 712/200 |
| 6,898,696 B1 * | 5/2005 | Cheong et al. ........... 712/228 |
| 7,035,785 B2 * | 4/2006 | Grochowski et al. ....... 703/18 |
| 7,134,036 B1 * | 11/2006 | Guan .................... 713/500 |
| 2006/0069928 A1 * | 3/2006 | Winick et al. ........... 713/300 |

* cited by examiner

*Primary Examiner*—Thomas Lee
*Assistant Examiner*—Ji H Bae
(74) *Attorney, Agent, or Firm*—Michael J. LeStrange; Hoffman Warnick LLC

(57) ABSTRACT

Method and systems for dynamically recovering from voltage droops are disclosed. In one embodiment, a microprocessor coupled to a plurality of voltage sensing circuits is provided. The microprocessor includes an instruction sequencing unit and pipeline including a first series of instructions. A central voltage droop detection processor may be coupled to each of the voltage sensing circuits and the microprocessor. Voltage droop is detected using a voltage sensing circuit, after which processing of the microprocessor is interrupted. The pipeline may then be cleared. Subsequently, a second series of instructions including the first series of instructions, and additional instructions are issued. The additional instructions may include stall instructions that cause a delay in processing of the first series of instructions, which prevents re-occurrence of the voltage droop. The interruption and re-issuing also signals the microprocessor that all the data in a particular instruction stream might not be valid and allows recovery.

15 Claims, 2 Drawing Sheets

VOLTAGE DROOP DYNAMIC RECOVERY

TECHNICAL FIELD

The invention relates generally to microprocessor control, and more particularly, to a method and system for dynamically recovering from a voltage droop.

BACKGROUND ART

As integrated circuits continue to become more complex and consume more power, the problem of keeping a constant voltage across the entire integrated circuit (IC) is increasingly difficult. In particular, it is hard to ensure a constant voltage in design and even harder to predict in simulation. For example, instruction dependent voltage droops, i.e., those caused by instructions that consume resources sufficient to cause a voltage droop, are difficult to predict. Furthermore, conventional static timers used for simulation typically assume constant voltage, which causes false critical path predictions. The effect of these local or global voltage droops is that the maximum frequency of the IC is reduced.

There are several known approaches to this problem. In one approach, attempts are made to eliminate voltage droop fails by testing the IC under worst case voltage droop scenarios and decreasing the maximum frequency rating so that the part will not fail for a customer. This approach however oftentimes results in unnecessary maximum frequency rating reductions, e.g., of up to 140 MHz. In another approach, circuitry to sense voltage droops and reduce the IC frequency dynamically is used. Unfortunately, this latter approach is not very practical for situations with a fixed microprocessor to bus frequency ratio.

There is a need in the art for a solution that does not suffer from the problems of the related art.

SUMMARY OF THE INVENTION

Method and systems for dynamically recovering from voltage droops are disclosed. In one embodiment, a microprocessor coupled to a plurality of voltage sensing circuits is provided. The microprocessor includes an instruction sequencing unit and a pipeline including a first series of instructions. A central voltage droop detection processor may be coupled to each of the voltage sensing circuits and the microprocessor. Voltage droop is detected using a voltage sensing circuit for a resource in the IC, after which processing of the microprocessor is interrupted. The pipeline may then be cleared. Subsequently, a second series of instructions including the first series of instructions, and additional instructions are issued. The additional instructions may include stall instructions that cause a delay in processing of the first series of instructions, which prevents re-occurrence of the voltage droop. The interruption and re-issuing also signals the microprocessor that all the data in a particular instruction stream might not be valid and allows recovery. Using this approach, a microprocessor can run at a higher frequency than would be possible if one had to guard against a worst case voltage droop and the microprocessor continues to run at a constant frequency.

A first aspect of the invention provides a system for voltage droop recovery in an integrated circuit (IC), the system comprising: a voltage sensing circuit in the IC for a resource; a microprocessor coupled to the voltage sensing circuit, wherein the microprocessor includes an instruction sequencing unit and a pipeline including a first series of instructions; and a central voltage droop detection processor for detecting a voltage droop based on the voltage sensing circuit, and, in the case that the voltage droop is detected, interrupting processing in the microprocessor and causing issuing of a second series of instructions by the instruction sequencing unit.

A second aspect of the invention provides a system for voltage droop recovery in an integrated circuit (IC), the system comprising: a voltage sensing circuit for a resource in the IC; a microprocessor coupled to the voltage sensing circuit, wherein the microprocessor includes an instruction sequencing unit and a pipeline including a first series of instructions; and a central voltage droop detection processor for detecting a voltage droop based on the voltage sensing circuit, and, in the case that the voltage droop is detected: interrupting processing in the microprocessor, clearing the pipeline in the case that the voltage droop is detected, and causing issuing of a second series of instructions by the instruction sequencing unit, wherein the second series of instructions includes the first series of instructions and additional instructions including stall instructions to cause a delay in processing of the first series of instructions at the resource.

A third aspect of the invention provides a method of voltage droop recovery in an integrated circuit (IC), the method comprising the steps of: providing a voltage sensing circuit for at least one resource of the IC; providing a microprocessor coupled to each voltage sensing circuit, wherein the microprocessor includes an instruction sequencing unit and a pipeline including a first series of instructions; providing a central voltage droop detection processor coupled to each voltage sensing circuit and the microprocessor; detecting a voltage droop using the voltage sensing circuit; interrupting processing of the microprocessor in the case that the voltage droop is detected, the interrupting step including clearing the pipeline; and causing issuing a second series of instructions including the first series of instructions and additional instructions, wherein the additional instructions include stall instructions to cause a delay in processing of the first series of instructions by the resource, and wherein the causing step occurs each time the instruction sequencing unit subsequently generates the first series of instructions.

The illustrative aspects of the present invention are designed to solve the problems herein described and/or other problems not discussed.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which.

It is noted that the drawings of the invention are not to scale. The drawings are intended to depict only typical aspects of the invention, and therefore should not be considered as limiting the scope of the invention. In the drawings, like numbering represents like elements between the drawings.

DETAILED DESCRIPTION

Figure 1:
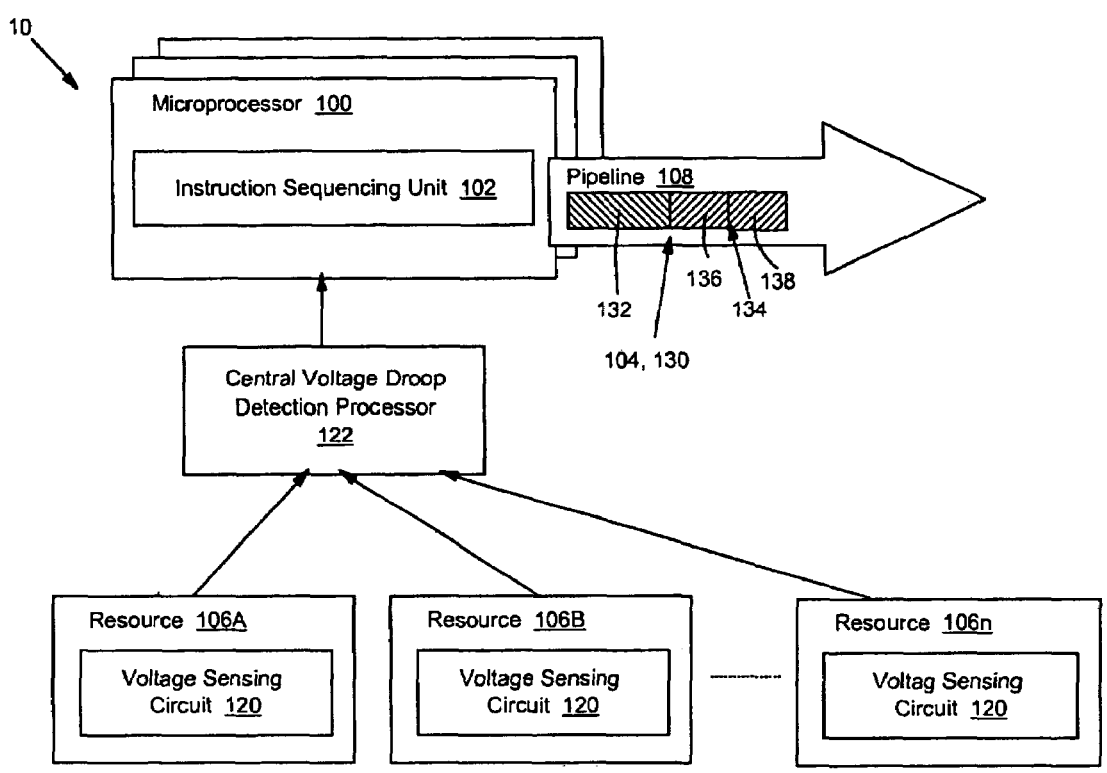
FIG. 1 shows a block diagram of one embodiment of a voltage droop recovery system according to the invention.

Turning to the drawings, FIG. 1 shows a block diagram of one embodiment of a voltage droop recovery system 10 for an integrated circuit (IC) according to the invention. System 10 includes one or more microprocessors 100, each of which include an instruction sequencing unit 102 that arranges a series of instructions 104 for transmission to various resources 106A-n, where n is an integer, via a pipeline 108 (only one shown). Resources 106A-n may include any now known or later developed IC component or combination of components that receives a voltage, e.g., Vdd. For example, resources 106A-n may include a cache, a load store unit, a fixed point unit, etc. Each resource 106A-n is shown provided with a voltage sensing circuit 120, which may include any now known or later developed circuitry for sensing a voltage and signaling a change. It is understood, however, that voltage sensing circuit(s) 120 may alternatively be part of microprocessor(s) 100. Microprocessor(s) 100 is coupled to the plurality of voltage sensing circuits 120.

In one embodiment, a central voltage droop detection processor 122 is provided to centralize and organize communication of the various voltage sensing circuits 120 to microprocessor(s) 100. Although not shown, each microprocessor 100 may include its own central voltage droop detection processor 122. Central voltage droop detection processor 122 may also function to determine whether a voltage droop occurs. Central voltage droop detection processor 122 is coupled to each voltage sensing circuit 120 and microprocessor(s) 100. However, where only a few voltage sensing circuits 120 are used, an independent central voltage droop detection processor 122 may not be necessary, and the functionality thereof may be implemented within one or more microprocessors 100.

Figure 2:
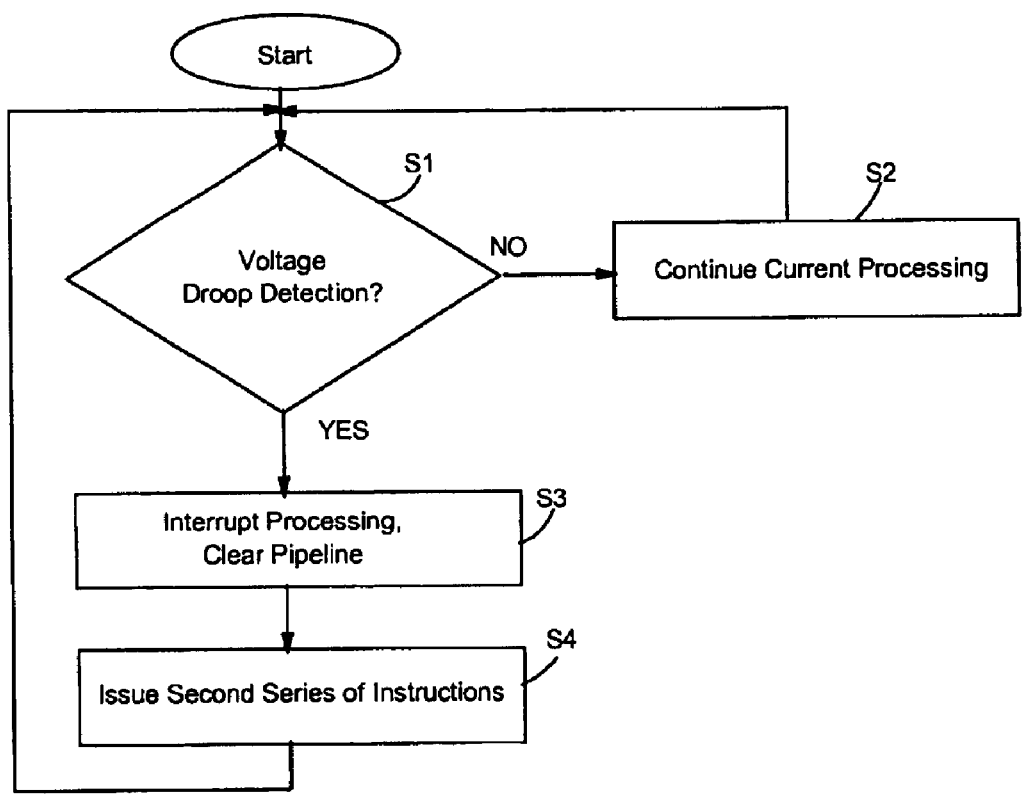
FIG. 2 shows a flow diagram of one embodiment of a method of voltage droop recovery according to the invention.

Turning to FIG. 2, one embodiment of operational methodology of system 10 will be described. In a first step S1, a voltage droop is detected using at least one of voltage sensing circuits 120. What constitutes a "voltage droop" may be user-defined, e.g., by setting a threshold at central voltage droop detection processor 122. Each resource 106A-n may have its own respective preset voltage droop threshold. If no voltage droop is detected, i.e., NO at step S1, then current processing by microprocessor(s) 100 continues at step S2. However, if a voltage droop is detected, i.e., YES at step S1, then at step S3, processing of microprocessor(s) 100 is interrupted. A voltage droop may be detected by one or more voltage sensing circuit 120. Since the voltage droop detection indicates that all the data in a particular instruction stream might not be valid, the interrupting step S3 may also include clearing pipeline 108, i.e., flushing a first series of instructions 104.

Next, in step S4, microprocessor 100 and/or central voltage droop detection processor 122 cause a second series of instructions 130 to be issued by instruction sequencing unit 102. In one embodiment, second series of instructions 130 includes first series of instructions 132, identical to the flushed series of instructions 104, and additional instructions 134. Additional instructions include stall instructions 136 to cause a delay in processing of the first series of instructions, e.g., no-operation instructions. Additional instructions 134 may also include other instructions 138 for a resource 106A-n, if necessary, e.g., instructions on how to re-initialize operations after the voltage droop. In another embodiment, second series of instructions may include a plurality of instruction sets, where each instruction set includes a part of the first series of instructions. In this fashion, the first series of instructions that cause the voltage droop can be parsed so as to prevent re-occurrence of the voltage droop. In one embodiment, each instruction set may not issue until a previous instruction set is completed so as to further prevent the voltage droop from re-occurring. In addition, each time first series of instructions 104 are subsequently generated, microprocessor 100 and/or central voltage droop detection processor 122 may cause second series of instructions 130 to be issued by instruction sequencing unit 102 to prevent the voltage droop from re-occurring.

Using the above-described approach, a microprocessor 100 can run at a higher frequency than would be possible if one had to guard against a worst case voltage droop and can continue to run at a constant frequency.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

What is claimed is:

1. A system for voltage droop recovery in an integrated circuit (IC), the system comprising:
    a voltage sensing circuit in the IC for a resource;
    a microprocessor coupled to the voltage sensing circuit, wherein the microprocessor includes an instruction sequencing unit and a pipeline including a first series of instructions for transmission to the resource; and
    a central voltage droop detection processor for detecting a voltage droop based on the voltage sensing circuit, and, in the case that the voltage droop is detected, interrupting processing in the microprocessor and causing the instruction sequencing unit to issue a second series of instructions for transmission to the resource, wherein the second series of instructions includes at least the first series of instructions.

2. The system of claim 1, wherein the second series of instructions further includes additional instructions.

3. The system of claim 2, wherein the additional instructions include stall instructions to cause a delay in processing of the first series of instructions at a resource.

4. The system of claim 1, wherein the second series of instructions includes a plurality of instruction sets, each instruction set including a part of the first series of instructions.

5. The system of claim 4, wherein each instruction set is not issued until a previous instruction set is completed.

6. The system of claim 1, further comprising a voltage sensing circuit coupled to each of a plurality of resources, and wherein the central voltage droop detection processor is coupled to each voltage sensing circuit and the microprocessor.

7. The system of claim 1, wherein the central voltage droop detection processor clears the pipeline in the case that the voltage droop is detected.

8. The system of claim 1, wherein the voltage droop is defined by a threshold.

9. The system of claim 1, wherein the central voltage droop detection processor causes issuing of the second series of instructions by the instruction sequencing unit each time the instruction sequencing unit subsequently generates the first series of instructions.

10. A system for voltage droop recovery in an integrated circuit (IC), the system comprising:
    a voltage sensing circuit for a resource in the IC;
    a microprocessor coupled to the voltage sensing circuit, wherein the microprocessor includes an instruction sequencing unit and a pipeline including a first series of instructions; and
    a central voltage droop detection processor for detecting a voltage droop based on the voltage sensing circuit, and, in the case that the voltage droop is detected:

interrupting processing in the microprocessor, clearing the pipeline in the case that the voltage droop is detected, and causing issuing of a second series of instructions by the instruction sequencing unit, wherein the second series of instructions includes the first series of instructions and additional instructions including stall instructions to cause a delay in processing of the first series of instructions at the resource.

11. The system of claim 10, further comprising a voltage sensing circuit coupled to each of a plurality of resources, and wherein the central voltage droop detection processor is coupled to each voltage sensing circuit and the microprocessor.

12. The system of claim 10, wherein the voltage droop is defined by a threshold.

13. The system of claim 10, wherein the central voltage droop detection processor causes issuing of the second series of instructions by the instruction sequencing unit each time the instruction sequencing unit subsequently generates the first series of instructions.

14. A method of voltage droop recovery in an integrated circuit (IC), the method comprising the steps of:

providing a voltage sensing circuit for at least one resource of the IC;

providing a microprocessor coupled to each voltage sensing circuit, wherein the microprocessor includes an instruction sequencing unit and a pipeline including a first series of instructions;

providing a central voltage droop detection processor coupled to each voltage sensing circuit and the microprocessor;

detecting a voltage droop using the voltage sensing circuit;

interrupting processing of the microprocessor in the case that the voltage droop is detected, the interrupting step including clearing the pipeline; and causing issuing a second series of instructions including the first series of instructions and additional instructions, wherein the additional instructions include stall instructions to cause a delay in processing of the first series of instructions by the resource, and wherein the causing step occurs each time the instruction sequencing unit subsequently generates the first series of instructions.

15. The method of claim 14, wherein the voltage droop is defined by a threshold.

* * * * *